US008982014B2

(12) United States Patent
Evans et al.

(10) Patent No.: US 8,982,014 B2
(45) Date of Patent: Mar. 17, 2015

(54) IMAGE GENERATION SYSTEMS AND IMAGE GENERATION METHODS (75) Inventors: Allan T. Evans, Richland, WA (US); Bruce E. Bernacki, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 240 days.

(21) Appl. No.: 13/367,261

(22) Filed: Feb. 6, 2012

(65) Prior Publication Data

US 2013/0201080 A1 Aug. 8, 2013

(51) Int. Cl.
G09G 5/00 (2006.01)
G02B 26/08 (2006.01)
G02B 26/10 (2006.01)
G02B 27/01 (2006.01)

(52) U.S. Cl.
CPC .......... *G02B 26/0833* (2013.01); *G02B 26/105* (2013.01); *G02B 27/017* (2013.01); *G02B 2027/0138* (2013.01)
USPC ....................................... 345/8; 345/7; 345/9

(58) Field of Classification Search
None
See application file for complete search history.

(56) References Cited

U.S. PATENT DOCUMENTS

| | | | |
|---|---|---|---|
| 5,170,153 A | 12/1992 | Migozzi et al. | |
| 5,309,188 A | 5/1994 | Burstyn | |
| 5,467,104 A | 11/1995 | Furness, III et al. | |
| 5,517,347 A | 5/1996 | Sampsell | |
| 5,596,339 A | 1/1997 | Furness, III et al. | |
| 5,625,372 A | 4/1997 | Hildebrand et al. | |
| 5,644,324 A | 7/1997 | Maguire | |
| 5,684,497 A | 11/1997 | Hildebrand et al. | |
| 5,684,498 A | 11/1997 | Welch et al. | |
| 5,764,202 A | 6/1998 | Welch et al. | |
| 5,870,068 A | 2/1999 | Hildebrand et al. | |
| 5,905,478 A | 5/1999 | Hildebrand et al. | |
| 6,094,182 A | 7/2000 | Maguire | |
| 6,386,706 B1 | 5/2002 | McClure et al. | |
| 6,726,332 B2 | 4/2004 | Cannon et al. | |
| 6,813,085 B2 | 11/2004 | Richards | |
| 6,943,955 B2 | 9/2005 | Kaschke et al. | |
| 7,046,214 B2 | 5/2006 | Ebersole et al. | |
| 7,068,444 B2 | 6/2006 | Nishi | |
| 7,116,352 B2 | 10/2006 | Yaron | |
| 7,375,701 B2 | 5/2008 | Covannon et al. | |
| 7,397,607 B2 | 7/2008 | Travers | |
| 7,675,684 B1 | 3/2010 | Weissman et al. | |

(Continued)

OTHER PUBLICATIONS

WO PCT/US2013/024785 Search Rep., May 8, 2013, Battelle Memorial Institute.

(Continued)

*Primary Examiner* — Adam R Giesy
(74) *Attorney, Agent, or Firm* — Wells St. John P.S.

(57) ABSTRACT

Image generation systems and image generation methods are described. According to one aspect, an image generation system includes an imaging system configured to transmit light towards an observer's eye to form a plurality of pixels of an image upon the retina of the observer's eye at a moment in time; and a control system coupled with the imaging system and wherein the control system is configured to access data content regarding the image, to generate a plurality of control signals according to the accessed data content, and to output the control signals to the imaging system to control the transmission of the light by the imaging system towards the observer's eye to form the plurality of pixels of the image upon the retina of the observer's eye at the moment in time.

15 Claims, 5 Drawing Sheets

(56) References Cited

U.S. PATENT DOCUMENTS

| | | | |
|---|---|---|---|
| 7,878,910 | B2 | 2/2011 | Wells |
| 8,068,129 | B2 | 11/2011 | Schechterman et al. |
| 2001/0017649 | A1 | 8/2001 | Yaron |
| 2001/0033326 | A1 | 10/2001 | Goldstein et al. |
| 2002/0030636 | A1 | 3/2002 | Richards |
| 2002/0154215 | A1 | 10/2002 | Schechterman et al. |
| 2004/0108971 | A1 | 6/2004 | Waldern et al. |
| 2006/0028400 | A1 | 2/2006 | Lapstun et al. |
| 2008/0055400 | A1 | 3/2008 | Schechterman et al. |
| 2008/0088937 | A1 | 4/2008 | Tang |
| 2008/0141127 | A1* | 6/2008 | Yamamoto et al. ........... 715/700 |
| 2008/0158343 | A1 | 7/2008 | Schechterman et al. |
| 2008/0158344 | A1 | 7/2008 | Schechterman et al. |
| 2009/0203332 | A1 | 8/2009 | Wihlborg |
| 2010/0149073 | A1* | 6/2010 | Chaum et al. ..................... 345/8 |
| 2011/0007277 | A1 | 1/2011 | Solomon |
| 2011/0018903 | A1 | 1/2011 | Lapstun et al. |
| 2011/0267321 | A1 | 11/2011 | Hayakawa |
| 2011/0268458 | A1 | 11/2011 | Wihlborg |

OTHER PUBLICATIONS

WO PCT/US2013/024785 Written Op., May 8, 2013, Battelle Memorial Institute.

Bablani et al., "An improved Head-Mounted Display for Virtual Reality", NVIS, Inc. Report, Jul. 2002-Feb. 2003, United States, 7 pages.

Bablani et al., "Design for an Improved Head-Mounted Display System Phase I Final Report", NVIS, Inc. Report, Feb. 3, 2003, United States, 33 pages.

Cartwright et al., "The Use of LCoS Microdisplays in 3D Optical Surface Metrology Systems", Society for Information Display Mid European Chapter Meeting 2008, Germany, 7 pages.

Dewald, "Introduction to DLP Optics", Nov. 22, 2010, URL http://www.dlinnovations.com/dli_docs/dlp_intro.pdf, 7 pages.

Hua et al., "Near-Eye Displays: State-of-the Art and Emerging Technologies", Proceedings of SPIE vol. 7690, (2010) United States, pp. 769009-1-769009-12.

Kollin et al., "Optical Engineering Challenges of the Virtual Retinal Display", Proceedings of SPIE vol. 2537 (1995) United States, pp. 48-60.

NVIS, Inc., "18 nVisor ST50", Apr. 10, 2011, URL http://www.nvisinc.com/product.php?id=66, 2 pages.

NVIS, Inc., "nVisor MH60 for HGU-56", Oct. 5, 2010, URL http://www.nvisinc.com/products.php?id=80, 1 page.

NVIS, Inc., "nVisor MH60 for HGU-84", Oct. 5, 2010, URL http://www.nvisinc.com/products.php?id=81, 1 page.

NVIS, Inc., "nVisor ST", Oct. 5, 2010, URL http://www.nvisinc.com/product.php?id=2, 1 page.

NVIS, Inc., "nVisor SX", Oct. 5, 2010, URL http://www.nvisinc.com/product.php?id=1, 1 page.

NVIS, Inc., "Products", Jan. 24, 2012, URL http://www.nvisinc.com/products.php, 3 pages.

Photonics, "How to Use to Use Engineered Diffusers", Nov. 14, 2007, URL http://www.rpcphotonics.com/how_to.asp, 3 pages.

Rolland et al., "Head-Mounted Display Systems", Encyclopedia of Optical Engineering DOI:P10.1081/E-EOE-120009801, © 2005 Taylor & Francis, United States, 14 pages.

Takahashi et al., "Stereoscopic See-Through Retinal Projection Head-Mounted Display", Proceedings of SPIE vol. 6803 (2008) United States, pp. 68031N-1-68031N-8.

Tauscher et al., "Evolution of MEMS Scanning Mirrors for Laser Projection in Compact Consumer Electronics", Proceedings of SPIE vol. 7594 (2010) United States, pp. 75940A-1-75940A-12.

Texas Instruments, Inc. "DLP™ System Optics", Application Report DLP022 (Jul. 2010) United States, 25 pages.

Texas instruments, Inc. "DMD 101: Introduction to Digital Micromirror Device (DMD) Technology", Application Report DLPA008A, Jul. 2008, United States, 11 pages.

ThorLabs, "0.37 NA Standard Hard Cladding Multimode Fibers", Oct. 19, 2007, URL http://www.thorlabs.com/NewGroupPage9.cfm?ObjectGroup_ID=1988, 1 page.

Urey et al., "Display and Imaging Systems" MOEMS: Micro-Opto-Electro-Mechanical Systems Chapter 8, Apr. 1, 2005, United States, pp. 369-375.

Woods et al., "DLP™-Based Dichoptic Vision Test System", Journal of Biomedical Optics vol. 15 (1), Jan./Feb. 2010, United States, pp. 016011-1-01611-13.

* cited by examiner

IMAGE GENERATION SYSTEMS AND IMAGE GENERATION METHODS

TECHNICAL FIELD

This disclosure relates to image generation systems and image generation methods.

BACKGROUND OF THE DISCLOSURE

Imaging systems are useful in many applications for business, science, military applications, entertainment, etc. The sophistication and quality of imaging systems continues to improve as imaging optics and digital processing devices also improve. Different imaging arrangements or implementations produce different types of images, for example, photographs or computer display screens of digital content, images generated by sensors, and composite images which may integrate virtual information with depictions of scenes of the real world, for example as captured by cameras. Different imaging systems may incorporate different sensors to generate images, for example, light sensors may be used to generate photographs or video content of the environment, infrared sensors may be utilized to detect radiation in the infrared range of the electromagnetic spectrum and may be utilized in thermal imaging cameras to generate thermal images of a scene.

At least some aspects of the disclosure are directed to systems and methods for generating images.

BRIEF DESCRIPTION OF THE DRAWINGS

Exemplary embodiments of the disclosure are described below with reference to the following accompanying drawings.

DETAILED DESCRIPTION OF THE DISCLOSURE

According to one embodiment, an image generation system includes an imaging system configured to transmit light towards an observer's eye to form a plurality of pixels of an image upon the retina of the observer's eye at a moment in time; and a control system coupled with the imaging system and wherein the control system is configured to access data content regarding the image, to generate a plurality of control signals according to the accessed data content, and to output the control signals to the imaging system to control the transmission of the light by the imaging system towards the observer's eye to form the plurality of pixels of the image upon the retina of the observer's eye at the moment in time.

According to an additional embodiment, an image generation system comprises a data generation system configured to generate data content of a two-dimension color image; an imaging system configured to transmit light towards an observer's eye to simultaneously form a plurality of pixels of the two-dimension image upon the retina of the observer's eye; a control system coupled with the data generation system and the imaging system, wherein the control system is configured to access the data content of the image, to generate a plurality of control signals according to the accessed data content, and to output the control signals to the imaging system to control the transmission of a plurality of light beams of the light and corresponding to respective ones the pixels in parallel towards the observer's eye to simultaneously form the pixels of the two-dimension color image upon the retina of the observer's eye; an eye monitoring system coupled with the control system, wherein the eye monitoring system is configured to monitor actions of the observer's eye; wherein the imaging system is configured to form a plurality of different color frames of the two-dimension color image at respective ones of a plurality of different moments in time, and the imaging system comprises: a light source configured to emit the light having different colors at the different moments in time; an optical fiber optically coupled with the light source and configured to homogenize the light and to combine multiple wavelengths of light; and a light modulator optically coupled with the light source and the optical fiber, wherein the light modulator comprises a plurality of mirrors which are configured to move between a plurality of positions, and wherein the control system is configured to generate the control signals to control different sets of the mirrors to move to one of the positions to reflect the light from the light source to the observer's eye at the different moments in time to form the different color frames of the two-dimension color image upon the retina of the observer's eye at the different moments in time and to reflect an image of the observer's eye to the eye monitoring system at an additional moment in time; and wherein the control system is configured to control at least one operation of the imaging system as a result of the reflection of the image of the observer's eye to the eye monitoring system.

According to another embodiment, an image generation method comprises accessing data content regarding an image; using the data content, identifying a plurality of pixels of the image which are to be formed at a moment in time; and after the identifying, transmitting light for the plural identified ones of the pixels of the image in parallel towards an observer's eye to form the plural identified ones of the pixels of the image upon the retina of the observer's eye at the moment in time.

Figure 1:
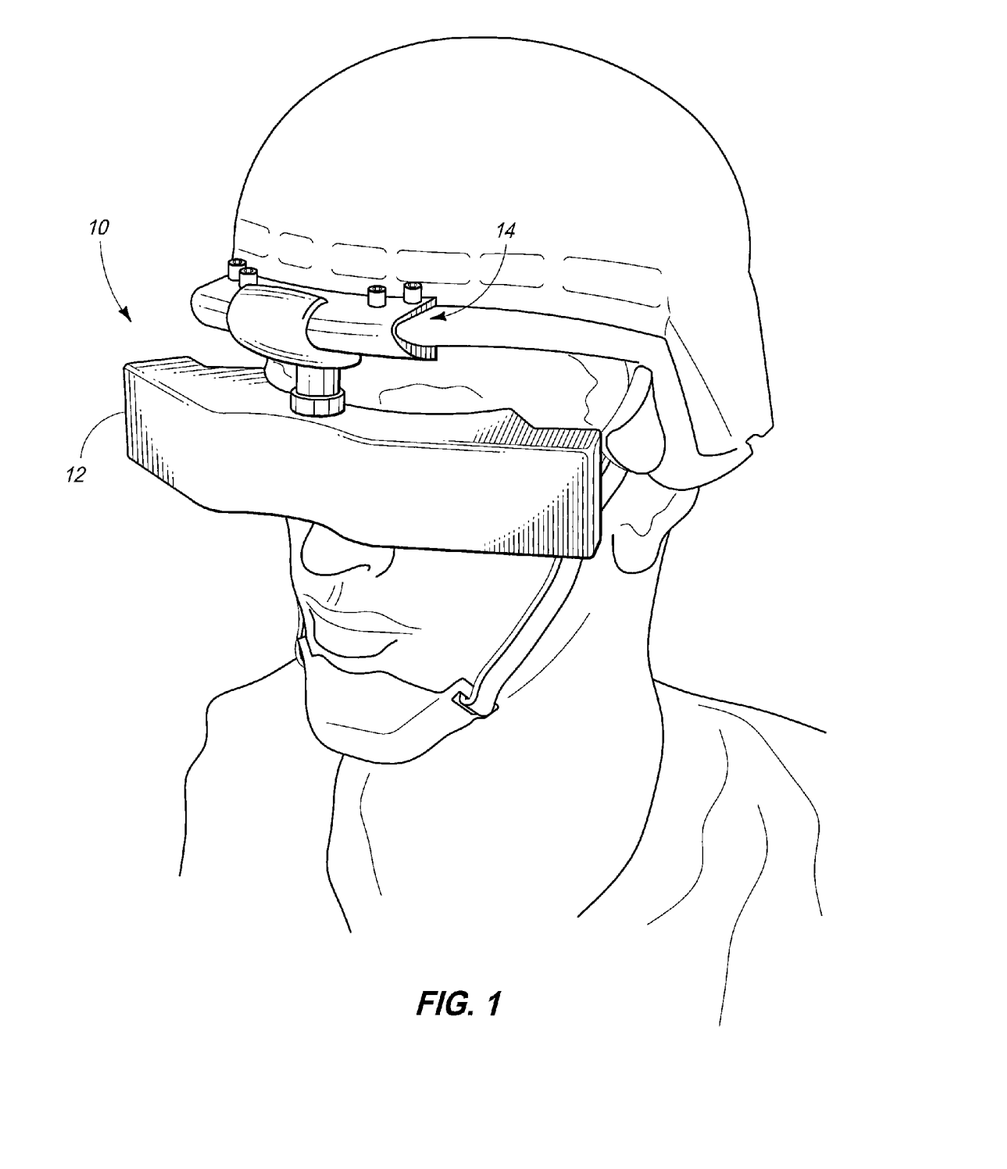
FIG. 1 is an example implementation of an image generation system according to one embodiment.

Referring to FIG. 1, an image generation system 10 configured to be worn on the head of a user is shown according to one embodiment. The illustrated image generation system 10 is implemented as a helmet mounted display (HMD) which is worn by the individual in the example of FIG. 1.

In one more specific example, the image generation system 10 may include a camera and/or sensor(s) which are configured to generate data content of images regarding an environment which is sensed or observed by the image generation system 10 and additional circuitry and imaging components may convey the data content as visual images to one or more individuals (the sensor(s), circuitry, and additional imaging components such as an imaging system are not illustrated in FIG. 1). The sensor(s), circuitry and components of the example image generation system 10 of FIG. 1 are provided within a housing 12 which is attached to a helmet and head of an individual using an attachment system 14. The housing 12 may protect components of the image generation system 10 from environmental elements in the illustrated configuration. Other embodiments are possible, for example, the system 10 may be integrated into a helmet or embodied in goggles separate from a helmet. Other configurations of attachment system 14 are possible for securing the system 10 to the user's head without use of a helmet (e.g., straps, hats, masks, etc.).

The image generation system 10 may be useful in a wide variety of applications. In but one example implementation, the image generation system 10 includes one or more thermal sensor(s) and optics to generate thermal images, for example, which may be useful in military or surveillance applications. The image generation system 10 may be implemented in different configurations in additional embodiments. For example, as mentioned above, the system 10 may include a camera to sense light in the environment about the system 10. In another example, the system 10 may be implemented in a vehicle and may include external cameras and/or sensors which are arranged to generate data content of the environment of the vehicle. Additionally, these cameras may form a stereo pair to produce three-dimensional images as well as target ranging information in some implementations. These implementations and applications of the image generation system 10 are illustrative and the image generation system 10 may be utilized in other implementations and applications where generation of images is desired.

Figure 2:
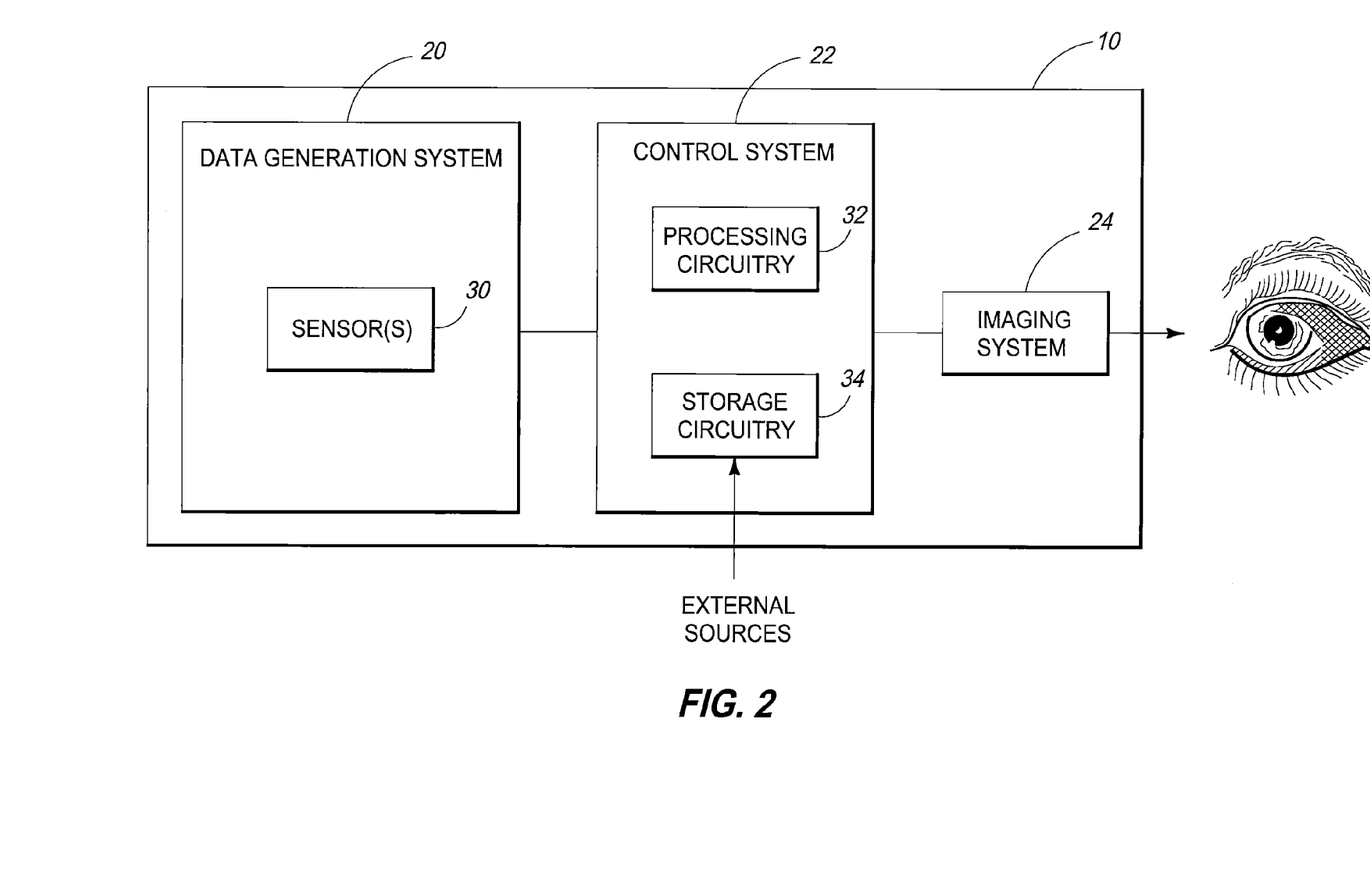
FIG. 2 is a block diagram of components of an image generation system according to one embodiment.
Figure 3:
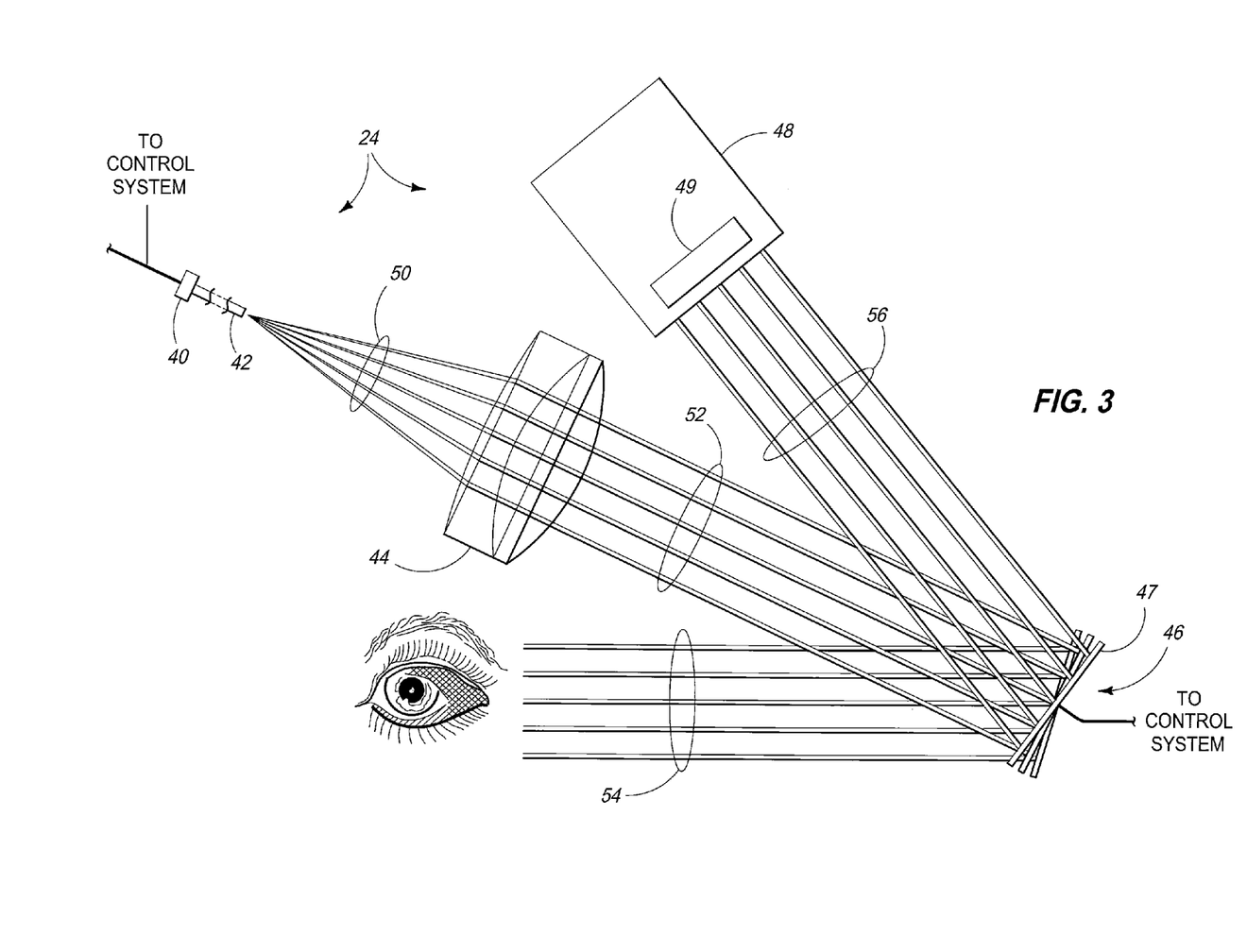
FIG. 3 is an illustrative representation of an imaging system according to one embodiment.

Referring to FIG. 2, circuitry and components of one embodiment of an image generation system 10 are shown. In the example depicted arrangement, the image generation system 10 includes a data generation system 20, a control system 22, and an imaging system 24. Furthermore, in the illustrated embodiment, the data generation system 20 includes one or more sensors 30 and the control system 22 includes processing circuitry 32 and storage circuitry 34. Details of an example configuration of imaging system 24 are shown in FIG. 3.

Additional components of image generation system 10 may also be provided. For example, a power source may be utilized to provide power to the systems 20, 22, 24 (e.g., a battery in portable applications) and the control system 22 may include an interface or communications circuitry to receive data content from external sources and which may be used to generate images for observation by a user.

Sensors 30 are configured to sense an environment about the image generation system 10 in the described embodiment. Furthermore, the sensors 30 may generate data content, for example, in electrical signals which may be utilized to generate images which visually represent the sensed environment. The sensors 30 may be configured to sense visible light, infrared, millimeter-wave, as well as terahertz radiation in example configurations.

The control system 22 is electrically coupled with the sensors 30 in the described embodiment. Processing circuitry 32 of the control system 22 may access data content regarding an image to be formed. Example data content specifies the intensities of a plurality of pixels of a digital image to be formed in one embodiment. The data content may be generated by sensors 30 of the data generation system 20, stored in storage circuitry 34, and/or accessed from external sensors or other sources external of the image generation system 10.

The processing circuitry 32 may additionally provide appropriate processing of the data content, and use the processed data content to generate and output control signals to the imaging system 34 to create visual images for viewing by a user in one embodiment. As discussed in detail below, the imaging system 24 uses an optical modulator in one embodiment to generate images. The control signals may control the movement of a plurality of mirrors of the optical generator between a plurality of positions (i.e., corresponding to on/off states) to generate images as discussed in additional detail below.

Processing circuitry 32 is arranged to process data, control data access and storage, and control other desired operations, for example, including implementing eye tracking operations discussed in additional detail below. Processing circuitry 32 may comprise circuitry configured to implement desired programming provided by appropriate computer-readable storage media in at least one embodiment. For example, the processing circuitry 32 may be implemented as one or more processor(s) and/or other structure configured to execute executable instructions including, for example, software and/or firmware instructions. Other exemplary embodiments of processing circuitry 32 include hardware logic, PGA, FPGA, ASIC, state machines, and/or other structures alone or in combination with one or more processor(s). These examples of processing circuitry 32 are for illustration and other configurations are possible.

Storage circuitry 34 is configured to store programming such as executable code or instructions (e.g., software and/or firmware), electronic data, databases, data content, or other digital information and may include computer-readable storage media. At least some embodiments or aspects described herein may be implemented using programming stored within one or more computer-readable storage medium of storage circuitry 34 and configured to control appropriate processing circuitry 32.

The computer-readable storage medium may be embodied in one or more articles of manufacture which can contain, store, or maintain programming, data and/or digital information for use by or in connection with an instruction execution system including processing circuitry 32 in the exemplary embodiment. For example, exemplary computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Imaging system 24 is described with respect to FIG. 3 according to one example implementation. The illustrated imaging system 24 may be utilized to generate visual images for observation by a user. In one embodiment, the image generation system 10 is configured as a virtual retinal display (VRD) and the imaging system 24 transmits light toward an observer's eye to form images directly upon the retina of the observer's eye and which image formed upon the retina is the only image formed (i.e., no real image is formed which the observer focuses upon) in one embodiment. As discussed below, a plurality of light beams are reflected and directed to the observer's eye to form pixels of the image upon the retina of the observer's eye. In some implementations, such as the example goggle configuration of FIG. 1, a plurality of the imaging systems 24 of FIG. 3 may be utilized to generate stereo or 3D visual images for viewing by both eyes of an individual. In one embodiment, the physical extent (e.g., diagonal measurement) of a light modulator (which may be used to generate images as discussed in detail below in one embodiment) is greater than the diameter of the entrance pupil of the viewer's eye in which the plurality of light beams entering the viewer's eye from the image generation system mimics a peripheral vision experience when viewing a scene directly without external viewing apparatus.

The depicted example configuration of the imaging system 24 of FIG. 3 includes a light source 40, an optical interface 42, an illuminator lens 44, a light modulator 46 and an eye monitoring system 48. Other configurations of the imaging system 24 may be utilized in other implementations.

The light source 40 is configured to emit light for use in generating the visual images which are observed by the user. The light source 40 may receive control signals from control system 22 and which control the emission of light according to the images to be created. The control signals may control parameters (e.g., intensity, color) and timing of the emitted light.

Different light sources 40 may be used depending upon the application of the image generation system 10, and for example, whether the system 10 generates monochrome or color images. In one example color implementation, light source 40 may be configured to generate a plurality of different colors of light (e.g., RGB, CMYK) to generate the images. In one more specific implementation, the different colors of light may be emitted sequentially to form color images. Light source 40 may be implemented as a plurality of light emitting diodes (LEDs) which are configured to generate red, green and blue light in one example. In another implementation, light source 40 may include a substantially white light source such as an incandescent source and a color wheel to generate different colors of light. In yet another example, light source 40 may be implemented using one or more lasers which are configured to emit different colors of light. These multiple colors of illumination light may be combined in free space using dichroic mirrors or using fusion spliced optic couplers in some arrangements.

Optical interface 42 is optically coupled with the light source 40 and is configured to transmit the generated light from the light source 40 and emit the light 50 towards the illuminator lens 44 in the illustrated embodiment. Optical interface 42 may be useful in configurations where there are physical size and/or space limitations upon the imaging system 24. In one embodiment, the optical interface 42 is implemented as an optical multi-mode fiber to transmit light.

The illuminator lens 44 is optically coupled with the optical interface 42 and is arranged to receive light 50 from the optical interface 42 and light source 40. The illuminator lens 44 is arranged to collimate the received light 50 and direct collimated light 52 towards light modulator 46. Illuminator lens 44 may be a doublet lens or triplet lens in example embodiments.

Light modulator 46 is arranged to receive the collimated light 52 and to selectively reflect the light in different directions to form images upon the retina of the observer's eye. In one embodiment, the physical extent of light modulator 46 may be greater (e.g., the Texas Instruments DLP 0.55 XGA has a diagonal measurement of 0.55 inch or ~14 mm) than the entrance pupil of a light-adapted human pupil (3-5 mm diameter) and the viewer will perceive a peripheral vision experience similar to natural vision in this presently-described embodiment. In one embodiment, light modulator 46 is a digital mirror device (DMD) which includes a plurality of micro-mirrors (only a single mirror 47 is shown in FIG. 3). More specifically, the digital mirror device includes a plurality of mirrors which may be arranged in a two dimension array and the mirrors may be controlled between different positions or states (e.g., on/off) to generate pixels of an image.

Control system 22 provides control signals which control individual mirrors between different positions corresponding to "on" and "off" states. As shown in FIG. 3, a mirror 47 is provided in an "on" position/state which reflects a beam of light 54 in a first direction towards the observer's eye and the beam of light 54 from a single mirror 47 forms a pixel of the image being generated upon the retina of the user's eye. The mirror 47 may also be provided in an "off" state which reflects a beam of light 56 in a second direction away from the observer's eye. The control of the mirrors 47 between "on" and "off" states according to data content of an image to be formed creates images.

In one specific example arrangement, light modulator 46 is implemented as a DLP 0.55 XGA Series 450 digital mirror device (DMD) available from Texas Instruments Inc. This example device includes an array of 1024×768 micro-mirrors with 10.8 μm mirror pitch and the array is 11.06 mm×8.3 mm with a diagonal of ~14 mm (0.55"). The micro-mirrors may be silicon on a CMOS substrate which is addressable by control signals from digital memory cells of the control system 22 in one embodiment.

Individual ones of the micro-mirrors of the array may rotate ±12° about a hinge across the mirror diagonal between a plurality of different positions to produce the mirror "on" and "off" states in the described embodiment. A power off state of the mirrors is 0° tilt while the "on" state may be +12° and the "off" state may be −12° in one embodiment. The control signals provided by the control system 22 control the mirrors between the "on" and "off" states according to the data content of an image to be formed. For example, the control signals may identify and control appropriate mirrors to be in the "on" state to reflect light towards the observer's eye while identifying and controlling other mirrors to be in the "off" state to reflect the light away from the observer's eye which results in the generation of an image. Image may refer to a complete image where all of the pixels of the image may be simultaneously imaged (e.g., monochrome image) or a frame of a color image (e.g., a plurality of sequential frames of different colors at different moments in time are perceived as a color image by the observer) in the presently described embodiment. The "on" mirrors may be referred to as a first set of mirrors and the "off" mirrors may be referred to as a second set of mirrors for a given image or frame.

In one embodiment, the mirrors of the array correspond to pixels of the image to be formed, and for a given image or frame, the control signals from the control system 22 may identify or specify which of the pixels are to be imaged to the observer's eye (i.e., which pixels are "on") and which pixels are not to be imaged to the observer's eye (i.e., which pixels are "off"). Accordingly, in one embodiment, for a given image or frame, a plurality of light beams may be reflected and directed by the light modulator 46 simultaneously in parallel to the observer's eye and to simultaneously form the plurality of pixels for the given image or frame upon the retina of the observer's eye in two dimensions at a moment in time when the given image or frame is to be formed.

Color images may be formed at a minimum by perceiving frames of primary colors of red, green and blue serially in one implementation. In one color image generation method, the light source 40 may sequentially emit red, green and blue light at respective moments in time and the mirrors may be controlled during the red light to provide a red frame of the image to the observer, then the mirrors may be controlled during the green light to provide a green frame of the image to the observer, and thereafter the mirrors may be controlled during the blue light to provide a blue frame of the image to the observer. The appropriate mirrors may be controlled between "on" and "off" states at a rate much faster than the persistence of human vision to form a color image (mirrors may be modulated thousands of times per second in one example). The resultant dithering can control the color and brightness level of individual pixels to match that of an original image in one embodiment.

As mentioned above, an LED light source 40 may be used and the optical interface 42 may transmit the emitted light.

The optical interface 42 may combine, convey and homogenize the emitted light which may include different wavelengths of light and may be implemented as a multimode optical fiber such as item FT400EMT available from Thorlabs, Inc. and which can be combined into a single large-core fiber using dichroic mirrors to reflect each individual RGB wavelength, but pass the other two for a three-color illuminator in one example. The above-mentioned fiber has a core diameter of 0.4 mm and a numerical aperture (NA) of 0.37. Also, fiber combiners can be used in place of dichroic free space combiners in some embodiments in which fibers are fusion spliced together in pairs to combine the different color illumination beams.

In one more specific embodiment, illuminator lens 44 may be a doublet having a 19 mm effective focal length (EFL) to collimate the output of the 0.37 NA fiber and completely illuminate the face of the array of mirrors of the light modulator 46. It should be noted that a multimode fiber will not strictly produce the collimated output of a point source, such as that offered by a single-mode fiber, but rather a plurality of collimated beams exiting the fiber end face at slightly different angles depending on the lateral extent of the source. However, because of the relatively small core diameter of 0.4 mm, a small range of angular light distribution is provided compared with an incandescent bulb-based illuminator or LED array. In one embodiment, the array of mirrors of the light modulator 46 reflects the incident light and the path length can be kept relatively short and compact with path lengths of less than 25 mm easily achieved.

In one embodiment, the light that contributes to the image conveyed by the light modulator 46 does not need a large field of view (FOV) viewing system to convey the image to the observer's eye(s). The designation of the "on" and "off" states is arbitrary, although acute angles of incidence on the DMD mirrors may be utilized to obtain efficient reflective return of light from the coated surfaces of the mirrors. The example configuration of FIG. 3 is also implemented without beam splitting elements which would otherwise reduce the intensity of the reflected light.

The eye monitoring system 48 of the illustrated imaging system 24 is configured to receive light 56 reflected by mirrors of the light modulator 46 which are in their "off" states. For example, the mirrors of the light modulator 46 may be controlled at desired moments in time to be in "off" states to reflect light to the eye monitoring system 48 which may include a digital camera 49 to capture an image of the observer's eye. In one example, the image of the observer's eye can be acquired between illumination pulses of source 40 so as not to saturate the camera 49 with light from the light source 40. In one embodiment, the imaging system 24 may convey sequential RGB frames of the image to the observer's eye at sequential moments in time, and thereafter the mirrors of modulator 46 may be controlled to the "off" state to enable the camera 49 to capture an image of the observer's eye before again providing additional RGB frames to the observer's eye. In another example, the light modulator 46 may provide images of the observer's eye to the camera 49 between individual ones of the RGB frames. Other embodiments and/or schemes of capturing images of the observer's eye during observation of generated images may be utilized.

In one embodiment, the monitoring of actions of the observer's eye using the eye monitoring system 48 may be utilized by the control system 22 to control operations of the image generation system 10. For example, some imaging systems 24 provide an exit pupil which is observed by the user. Information regarding the movement of the observer's eye may be utilized to adjust a turning mirror (not shown) to move the exit pupil corresponding to movement of the observer's eye. In another embodiment, eye movements tracked by the eye monitoring system 48 may also be used to control one or more sensors 30 of the image generation system 10. For example, if the user looks up, a sensor 30 such as a camera providing data content for observation by the user may be tilted upwards to change the view of observation or in the case of a stereo pair of cameras, to change the point of convergence of the system. The output of the eye monitoring system 48 may additionally be used for other purposes in other arrangements, for example, controlling a pointer using eye movements. Also, blinking may be utilized to control operations of the image generation device 10 in another embodiment.

In one embodiment mentioned above, the image generation system 10 is configured as a virtual retinal display (VRD) which forms images directly upon the retina of the observer's eye using the lens of the observer's eye as the final optical element. In one example, the only image generated by the imaging system 24 is the image generated upon the retina (i.e., without the generation of a real intermediate image in front of the user which the user focuses upon). For example, the light modulator 46 directs the light 54 to the lens and cornea of the observer's eye to convey the image directly onto the retina of the observer's eye. In one embodiment, the exit pupil of the imaging system 24 is coplanar with the entrance pupil of the observer's eye. The light modulator 46 directs the light 54 which includes a plurality of parallel beams from respective ones of the mirrors in the described embodiment to the observer's eye and the lens and cornea of the observer's eye focus the beams on the retina thereby forming the image upon the observer's eye.

In the described example embodiment, the light modulator 46 directs the plurality of beams which correspond to different pixels for the image (e.g., a red frame of the image) simultaneously in parallel to the observer's eye at a common moment in time. The angles at which the beams of light 54 enter the observer's eye determine the respective positions on the retina where the beams are focused. These angles also contribute a natural viewing experience simulating peripheral vision in some embodiments (e.g., one embodiment is discussed in further detail below in FIG. 5).

In the illustrated example of FIG. 3, the mirrors of the light modulator 46 may direct light between the paths of light 54, 56. In addition, other arrangements of the imaging system 24 are possible to accommodate different implementations. For example, one or more additional mirrors may be used to direct light reflected from the light modulator 46 towards the observer's eye, to the eye monitoring system 48, or other desired locations in other embodiments.

Figure 4:
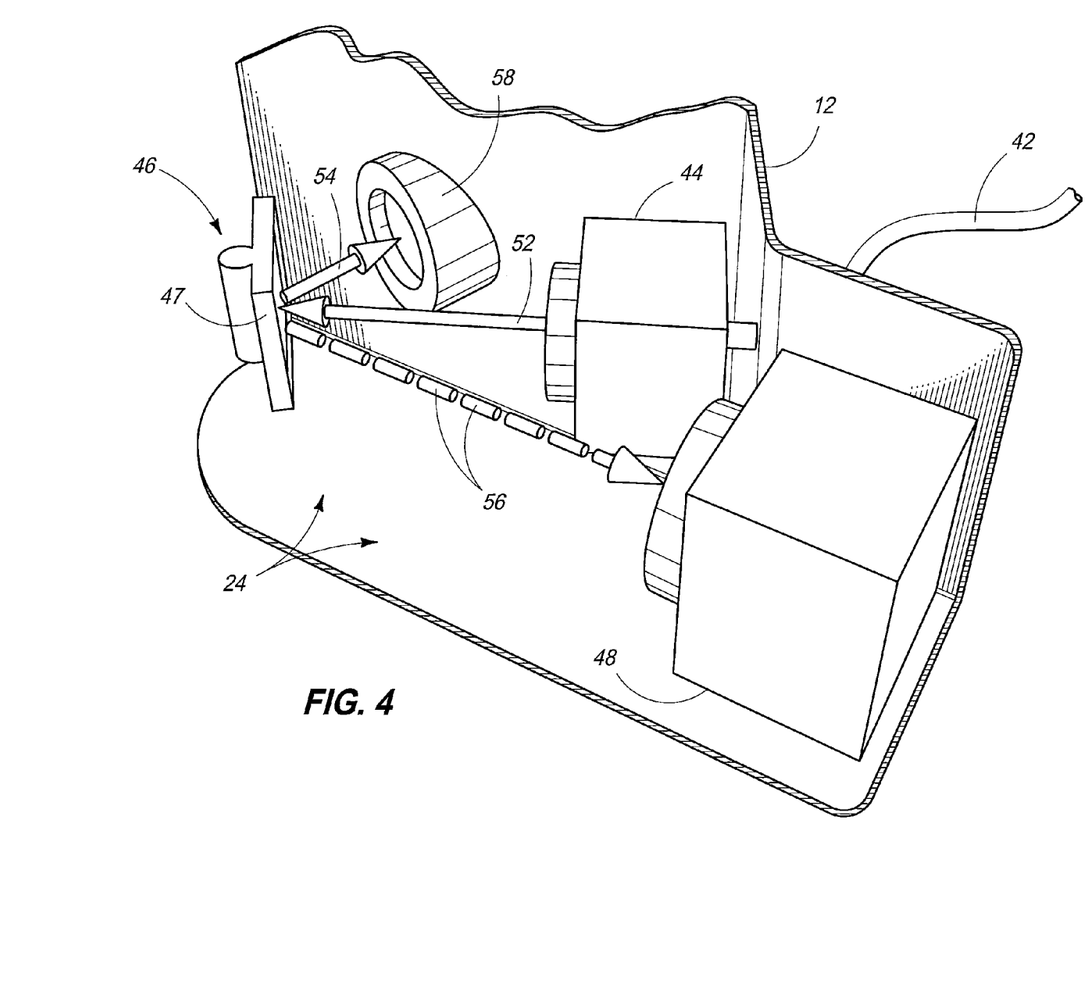
FIG. 4 is an isometric representation of components of an imaging system according to one embodiment.

Referring to FIG. 4, an imaging system 24 arranged in an example goggle configuration is shown according to one embodiment. In the illustrated configuration, the light source 40 is external of the housing 12 and is not shown. The optical interface 42 transmits the light from the external light source 40 internally of the housing 12 to the illuminator lens 44 which directs the light 52 towards the light modulator 46 (only one mirror 47 of the light modulator 46 is shown in FIG. 4).

The individual mirrors 47 of the light modulator 46 may be selectively controlled between "on" and "off" states to selectively direct light 54 towards an eyepiece 58 for observation by the user or to the eye monitoring system 48, respectively. In one embodiment, the housing 12 is sealed to prevent environmental light from entering the interior of the housing 12 and substantially the only light viewed by the user is light 54 reflected by the light modulator 47. Consequently, some arrangements of the device do not provide an optical signature which would reveal the viewer's location in military applications of nighttime usage.

In one configuration, eyepiece 58 is an Erfle eyepiece arranged to relay the intermediate image of the light 54 to the retina of the observer's eye. The example eyepiece 58 is designed to relay the image formed at the focus of a telescope and map the image to infinity (collimation space). This "image at infinity" is conveyed to the lens of the observer's eye, exploiting the ability of humans' visual accommodation, and is subsequently focused onto the retina.

Figure 5:
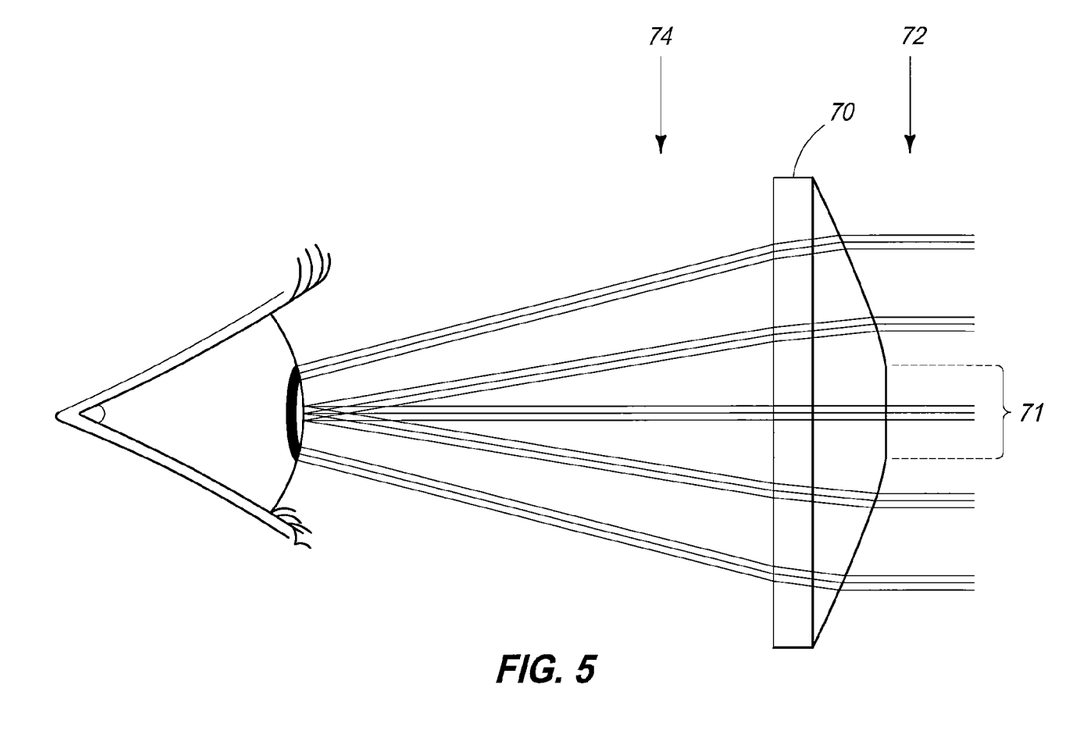
FIG. 5 is an illustrative representation of an auxiliary optical element of an imaging system according to one embodiment.

Referring to FIG. 5, one embodiment of an auxiliary optical element 70 which may be used in one arrangement of imaging system 24 is shown. The example element 70 is an axicon in the depicted arrangement which may be utilized to enhance peripheral vision of an observer. In one implementation, optical element 70 may be inserted between the light modulator 46 and the observer's eye, and a bundle of rays 72 may be received from the light modulator 46 and directed as a bundle of rays 74 to the observer's eye (or initially directed to eyepiece 58 prior to reception within the observer's eye in embodiments in which eyepiece 58 is utilized). While the individual bundles of rays 72, 74 each include five groups of rays in FIG. 5 for sake of simplicity, the bundles of rays 72, 74 each typically include more rays which would be included between the five groups of rays depicted.

The bundle of rays 72 which are reflected by the light modulator 46 may be larger than the pupil of the observer's eye which would typically be adapted to light generated by the imaging system 24 to create visual images (e.g., bundle of rays 72 may be in a 10 mm×10 mm square versus a light-adapted pupil diameter of 3 mm). The element 70 may be implemented as an axicon having a truncated cone tip region 71 which may approximate the size of the observer's light adapted pupil. The truncated cone tip region 71 would allow central rays to pass through the element 70 to impinge upon the portion of the observer's eye responsible for central vision. The other non-truncated angled portions of the axicon element 70 deviates the other rays towards the pupil at angles so the rays impinge upon areas of the observer's eye rich in rods which are responsive to peripheral vision. The angles of the angled portions of the axicon element 70 may be chosen based on various factors such as the distance to the observer's eye. The use of this example element 70 directs the bundle of rays 74 to the observer's eye from a plurality of different angles which enhances peripheral vision of the observer compared with arrangements which do not use optical element 70.

At least some implementations of the imaging system 24 described above utilize light sources other than lasers which are typically used in scanning implementations. For example, the light source may include one or more LEDs in one embodiment. Furthermore, the pixels of the light modulator for an image or frame may be delivered to the observer in parallel freeing time for other sensing and processing operations (e.g., eye tracking) compared with a scanning approach. Also, the imaging system may be implemented without the use of polarization elements in one embodiment which provides greater efficiency of illumination compared with arrangements which utilize polarization elements. Additionally, the "Off" state of the micro-mirrors discussed above in one implementation can be used to direct light reflected from the observer's eye to the eye monitoring system without the use of a lossy beam splitter for a "hands free" control of delivered content by blinking, rotating the eye up or down, or other distinct eye movements that can be exploited as a pointer or mapped into other user commands. The use of a fiber-delivered collimated illuminator beam in one embodiment (e.g., through the use of a multi-mode fiber) homogenizes the beam and produces a nearly point or small source that may be easily re-imaged onto the lens of the observer's eye compared with the use of an extended incandescent illuminator or LED array without the use of the optical interface.

In addition, the use of pulsed LED illumination has relatively low power consumption enabling battery-powered implementations of the image generation system. High illumination efficiency results from the use of unpolarized LED illumination in one embodiment. Further, the image generation system may be arranged in a relatively compact size for person-borne display technology using glasses, goggles, helmet mounted displays or other arrangement. The image generation system may include one or two imaging systems for stereoscopic or three dimensional displays of user input. Additionally, a final turning mirror may be provided to permit adjustment of the inter pupillary distance (this ranges from 55 mm to 75 mm for 95% of adult humans) by rotation of the final turning mirror as well as translation of the image digitally in the display. Reduced eye fatigue may be provided due to the eye's focus of the object at infinity in one example. Also, the optical system is adjustable to account for different viewer's visual acuity. The use of a relatively low emission projection light permits use of the system in a head-mounted display for military and police nighttime operations. Also, a multiple-wavelength viewer may be implemented by combining camera images at wavelengths from the visible to the long wave infrared for warfighter applications and daytime/nighttime operations. The system may provide secure display operation since the image is only seen by the intended viewer in some embodiments.

Some embodiments utilizing a digital light modulator as discussed herein enable generation of video-rate digital images having HD resolution which can be viewed by a relaxed eye focused at infinity, which greatly reduces eye strain and makes possible a variety of low-power, compact, user-wearable display devices for commercial, military and police applications. As also discussed above, dual arrangements of the imaging system can also be realized for stereoscopic or three-dimension imaging for an immersion environment in which several different imaging modalities may be fused, such as visible, thermal infrared, and millimeter wave imagers for activities utilizing excellent depth perception, such as piloting an aircraft, tank or other vehicle.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An image generation system comprising:
an imaging system configured to transmit light towards an observer's eye to form a plurality of pixels of a plurality of two-dimension color images upon a retina of the observer's eye at respective ones of a plurality of different moments in time;
a control system coupled with the imaging system and wherein the control system is configured to access data content regarding the images, to generate a plurality of control signals according to the accessed data content, and to output the control signals to the imaging system to control the provision of a plurality of light beams of the light which correspond to respective ones of the pixels of one of the two-dimension color images in parallel towards the observer's eye to simultaneously form the pixels of the one of the two-dimension color images upon the retina of the observer's eye at one of the moments in time; and
wherein the imaging system comprises:
a light source configured to emit the light having different colors at the different moments in time; and
a light modulator optically coupled with the light source, wherein the light modulator comprises a plurality of mirrors which are individually configured to move between a plurality of positions, and wherein the control system is configured to generate the control signals to control different sets of the mirrors to move to one of the positions to reflect the light from the light source to the observer's eye at the different moments in time to form the two-dimension color images upon the retina of the observer's eye at the different moments in time.

2. The system of claim 1 wherein the imaging system is configured to reflect the light from the light source to the observer's eye from a plurality of different angles to enhance peripheral vision of the observer.

3. The system of claim 1 wherein the imaging system is configured to reflect the light beams in parallel towards the observer's eye.

4. The system of claim 1 wherein the imaging system directs the light from the light source and reflected from the different sets of mirrors without further reflection to the observer's eye.

5. The system of claim 1 wherein the control system is configured to generate the control signals to control other sets of the mirrors to reflect some of the light from the light source away from the observer's eye at the different moments in time.

6. The system of claim 1 wherein the light source is an LED.

7. The system of claim 1 wherein the light source is a laser.

8. The system of claim 1 wherein the mirrors are configured to reflect an image of the observer's eye to an eye monitoring system.

9. An image generation system comprising:
a data generation system configured to generate data content of a two-dimension color image;
an imaging system configured to transmit light towards an observer's eye to simultaneously form a plurality of pixels of the two-dimension image upon the retina of the observer's eye;
a control system coupled with the data generation system and the imaging system, wherein the control system is configured to access the data content of the image, to generate a plurality of control signals according to the accessed data content, and to output the control signals to the imaging system to control the transmission of a plurality of light beams of the light and corresponding to respective ones of the pixels in parallel towards the observer's eye to simultaneously form the pixels of the two-dimension color image upon the retina of the observer's eye;
an eye monitoring system coupled with the control system, wherein the eye monitoring system is configured to monitor actions of the observer's eye;
wherein the imaging system is configured to form a plurality of different color frames of the two-dimension color image at respective ones of a plurality of different moments in time, and the imaging system comprises:
a light source configured to emit the light having different colors at the different moments in time;
an optical fiber optically coupled with the light source and configured to homogenize the light; and
a light modulator optically coupled with the light source and the optical fiber, wherein the light modulator comprises a plurality of mirrors which are configured to move between a plurality of positions, and wherein the control system is configured to generate the control signals to control different sets of the mirrors to move to one of the positions to reflect the light from the light source to the observer's eye at the different moments in time to form the different color frames of the two-dimension color image upon the retina of the observer's eye at the different moments in time and to reflect an image of the observer's eye to the eye monitoring system at an additional moment in time; and
wherein the control system is configured to control at least one operation of the imaging system as a result of the reflection of the image of the observer's eye to the eye monitoring system.

10. An image generation method comprising:
accessing data content regarding a plurality of two-dimension color images;
using the data content, generating a plurality of control signals;
using a light source of an imaging system, emitting light having different colors at a plurality of different moments in time;
using the imaging system, transmitting the light towards an observer's eye to form a plurality of pixels of a plurality of two-dimension color images upon a retina of the observer's eye at respective ones of a plurality of different moments in time;
outputting the control signals to the imaging system to control provision of a plurality of light beams of the light which correspond to respective ones of the pixels of one of the two-dimension color images in parallel towards the observer's eye to simultaneously form the pixels of the one of the two-dimension color images upon the retina of the observer's eye at one of the moments in time;
using the control signals, controlling a light modulator of the imaging system which is optically coupled with the light source, wherein the light modulator comprises a plurality of mirrors which are individually configured to move between a plurality of positions, and the control signals control different sets of the mirrors to move to one of the positions to reflect the light from the light source to the observer's eye at the different moments in time to form the two-dimension color images upon the retina of the observer's eye at the different moments in time.

11. The method of claim 10 wherein the light modulator reflects the light beams of the light in parallel.

12. The method of claim 10 further comprising:
   using the optical modulator, reflecting an image of the observer's eye at another moment in time; and
   monitoring the image of the observer's eye.

13. The method of claim 10 further comprising controlling some of the mirrors to be in a second of the different positions to reflect some of the light of the light source away from the observer's eye at the different moments in time.

14. The method of claim 10 wherein the imaging system forms the image upon the retina of the observer's eye without forming a real image which the observer focuses upon.

15. The method of claim 10 wherein the reflecting the light from the light source to the observer's eye comprises reflecting the different colors of the light corresponding to the two-dimension color images at the different moments in time.

\* \* \* \* \*